United States Patent
Messing et al.

(10) Patent No.: US 7,471,843 B2
(45) Date of Patent: Dec. 30, 2008

(54) SYSTEM FOR IMPROVING AN IMAGE DISPLAYED ON A DISPLAY

(75) Inventors: Dean Messing, Camas, WA (US); Louis J. Kerofsky, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 878 days.

(21) Appl. No.: 10/869,770

(22) Filed: Jun. 15, 2004

(65) Prior Publication Data
US 2005/0169551 A1 Aug. 4, 2005

Related U.S. Application Data

(60) Provisional application No. 60/542,246, filed on Feb. 4, 2004.

(51) Int. Cl.
*G06K 9/40* (2006.01)

(52) U.S. Cl. .................. 382/260; 382/103; 235/462.41

(58) Field of Classification Search .............. 382/260, 382/309, 270
See application file for complete search history.

(56) References Cited

U.S. PATENT DOCUMENTS

| | | | |
|---|---|---|---|
| 5,254,982 A | 10/1993 | Feigenblatt et al. | |
| 5,339,092 A | 8/1994 | Johnson et al. | |
| 5,528,740 A | 6/1996 | Hill et al. | |
| 5,635,699 A * | 6/1997 | Cherry et al. | 235/462.41 |
| 5,949,428 A | 9/1999 | Toelle et al. | |
| 5,960,097 A * | 9/1999 | Pfeiffer et al. | 382/103 |
| 6,018,596 A | 1/2000 | Wilkinson | |
| 6,020,868 A | 2/2000 | Greene et al. | |
| 6,192,162 B1 | 2/2001 | Hamilton, Jr. et al. | |
| 6,314,207 B1 | 11/2001 | Persiantsev et al. | |
| 6,339,426 B1 | 1/2002 | Lui et al. | |
| 6,356,278 B1 | 3/2002 | Stamm et al. | |
| 6,377,262 B1 | 4/2002 | Hitchcock et al. | |
| 6,393,145 B2 | 5/2002 | Betrisey et al. | |
| 6,597,360 B1 | 7/2003 | Stamm et al. | |
| 6,608,632 B2 | 8/2003 | Daly et al. | |
| 6,775,420 B2 | 8/2004 | Daly | |
| 6,807,319 B2 | 10/2004 | Kovvuri et al. | |
| 2003/0194010 A1* | 10/2003 | Mukerjee et al. | 375/240.16 |
| 2003/0206663 A1* | 11/2003 | Daly | 382/260 |
| 2004/0264798 A1 | 12/2004 | Daly | |

OTHER PUBLICATIONS

Ron I. Feigenblatt, "Full-color imaging on amplitude-quantized color mosaic displays," Digital Image Processing Applications, Los Angeles, Jan. 1989, Proc. SPIE, vol. 1075, pp. 199-205.

John Kranz and Louis Silverstein, "Color matrix display image quality: The effects of luminance and spatial sampling," SID International Symposium, Digest of Technical Papers, pp. 29-32, 1990.

(Continued)

*Primary Examiner*—Brian Q Le
*Assistant Examiner*—Tsung-Yin Tsai
(74) *Attorney, Agent, or Firm*—Chernoff, Vilhauer, McClung & Stenzel

(57) ABSTRACT

A system for improving the an image displayed on a display.

11 Claims, 15 Drawing Sheets

OTHER PUBLICATIONS

Russel A. Martin, Albert J. Ahumade, Jr., and James O. Larimer, "Color matrix display simulation based upon luminance and chromatic contrast sensitivity of early vision," Human Vision, Visual Processing, and Digital Display III, B. E. Rogowitz, Ed., Bellingham, WA, 1992, Proc. SPIE, vol. 1666, pp. 336-342.

John C. Platt, "Optimal filtering for patterned displays," IEEE Signal Processing Letters, vol. 7, No. 7, pp. 179-180, 2000.

Claude Betrisey et al., "Displaced filtering for patterned displays," SID International Symposium, Digest of Technical Papers, vol. 31, pp. 296-299, 2000.

Michiel A. Klompenhouwer, Gerard De Haan, and Rob A Beuker, "Subpixel image scaling for color matrix displays," SID International Symposium, Digest of Technical Papers, vol. 33, pp. 176-179, May 2002.

Dean S. Messing and Scott Daly, "Improved display resolution of subsampled colour images using subpixel addressing," in Proc. Int. Conf. Image Processing (ICIP'02), Rochester, NY, Sep. 2002, IEEE Signal Processing Society, vol. 1, pp. 625-628.

Dean S. Messing, Louis Kerofsky, and Scott Daly, "Subpixel rendering on non-striped colour matrix displays," in Proc. Int. Conf. Image Processing (ICIP'03), Barcelona, Spain, Sep. 2003, IEEE Signal Processing Society.

Jeffrey Lubin, "A Visual Discrimination Model for Imaging System Design and Evaluation," pp. 245-283, Chapter 10 of Vision Models for Target Detection and Recognition, 1995, World Scientific Press.

Scott Daly, "The Visible Differences Predictor: An Algorithm for the Assessment of Image Fidelity," Chapter 14 of Digital Images and Human Vision, 1993, MIT Press, pp. 179-206.

X. Zhang and B. Wandell, "A Spatial Extension of CIELAB for Digital Color Image Reproduction," SID Symposium 1996, Digest pp. 731-724.

* cited by examiner

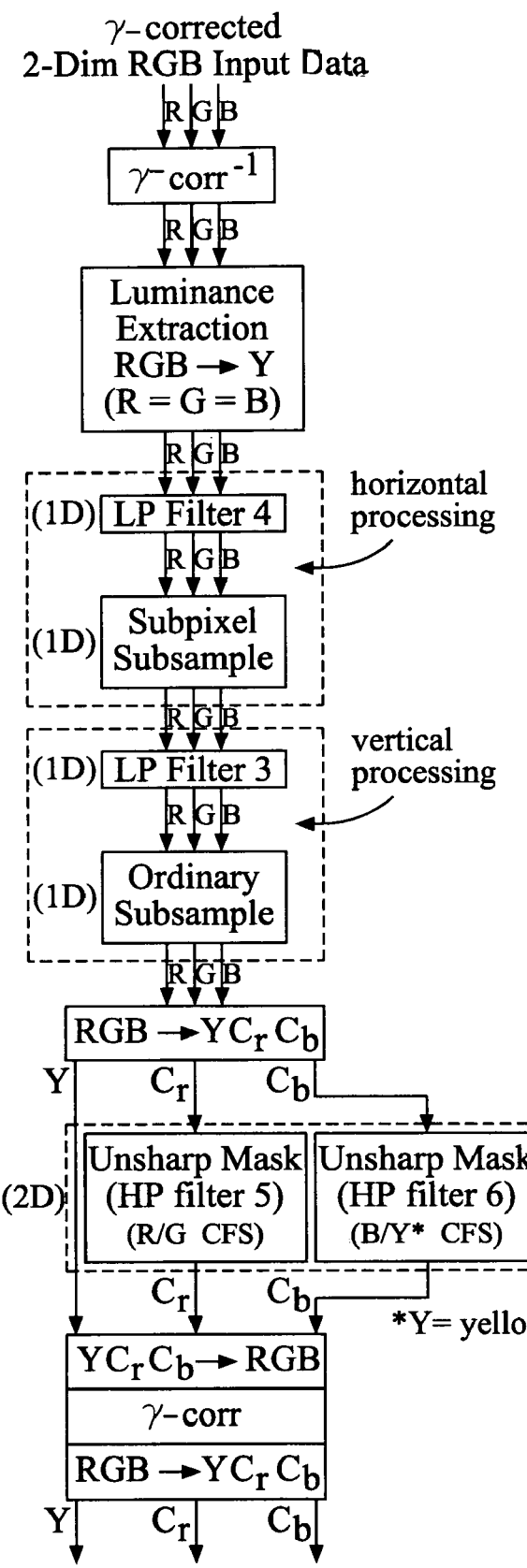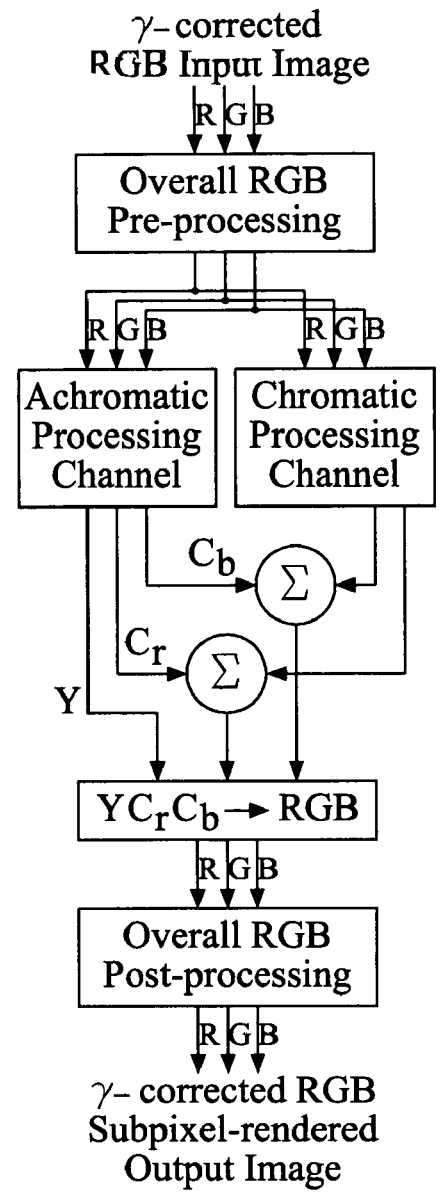
FIG. 7A
FIG. 7B

SYSTEM FOR IMPROVING AN IMAGE DISPLAYED ON A DISPLAY

CROSS-REFERENCE TO RELATED APPLICATIONS

This application claims the benefit of U.S. Provisional Patent Application Ser. No. 60/542,246 filed Feb. 4, 2004 as SUBPIXEL RENDERING ON NON-STRIPED COLOUR MATRIX DISPLAYS.

BACKGROUND OF THE INVENTION

The present invention relates to displaying images on a display.

The most commonly used method for displaying high-resolution images on a lower resolution color mosaic (i.e. color matrix) display is to prefilter and re-sample the pixels 2 of the high-resolution image 4 down to the resolution of the low-resolution display 6, as shown in FIG. 1. In the process, the R, G, B values of selected color pixels 8 are mapped to the separate R, G, B elements 10, 12 and 14 of each display pixel 16. These R, G, B elements 10, 12 and 14 of a display pixel are sometimes also referred to as subpixels. Because the display device does not allow overlapping color elements the subpixels are spatially distinct. In addition, the subpixels can only take on one of the three R, G, or B colors. The color's amplitude, however, can be varied throughout the entire grey scale (i.e. brightness) range (e.g., 0-255 for "8-bit" pixels). The subpixels often have approximately (neglecting the black regions) a 1:3 aspect ratio (width:height), so that the resulting pixel 16 is square. The aforementioned subsampling/rendering techniques fail to consider the fact that the display's R, G, and B subpixels are spatially displaced; in fact the pixels of the low resolution image are assumed to be overlapping in the same manner as they are in the high-resolution image. This type of sampling may be referred to as subsampling, traditional subsampling, or ordinary subsampling.

The pixels of the high-resolution image 4 are shown as three slightly offset stacked squares 8 to indicate their RGB values are associated with the same spatial position (i.e., pixel), generally referred to as co-sited subpixels. One display pixel 16 on a color mosaic display, consisting of one each of the R, G and B subpixels 10, 12 and 14 is shown as part of the lower-resolution striped display 6 in FIG. 1.

In the example shown in FIG. 1, the high-resolution image has 3× more resolution than the display (in both horizontal and vertical dimensions). In the case that prefiltering is omitted, the subsampling process would cause undesirable aliasing artifacts, and, accordingly, various methods are used, such as averaging the neighboring un-sampled pixels in with the sampled pixel, to reduce the aliasing. In addition, the subsampling technique of FIG. 1 results in mis-registration of the color fields each of which carries a portion of the luminance information. This is due to the displaced subpixels, and leads to a loss of luminance resolution attainable at the subpixel sampling rate.

It is noted that the technique of weighted averaging of neighboring elements while subsampling is mathematically equivalent to FIR prefiltering the high resolution image. Also, it is noted that techniques of selecting a different pixel than the leftmost (as shown in FIG. 1) can be considered as a prefiltering that affects only the phase spectrum (spatial shift) of the high resolution image. Thus, most of the processing associated with reducing aliasing may be viewed as a filtering operation on the high-resolution image, even if the filter kernel is applied only at the sampled pixel positions.

It has been realized that the aforementioned techniques do not take advantage of potential display resolution beyond that determined by the Nyquist limit due to the display pixel spacing. Information regarding potential display resolution is discussed by R. Fiegenblatt (1989), "Full color imaging on amplitude color mosaic displays" Proc. SPIE V. 1075, 199-205; and J. Kranz and L. Silverstein (1990) "Color matrix display image quality: The effects of luminance and spatial sampling," SID Symp. Digest 29-32, incorporated herein by reference.

For example, in the display shown in FIG. 1, while the display pixel 16 resolution is ⅓ that of the pixel resolution of the high resolution image (source image) 4, the subpixels 10, 12 and 14 of the low resolution display are at a resolution equal to that of the high resolution image (in the horizontal dimension). This may be taken advantage of as shown in FIG. 2. For each pixel of the high resolution image a luminance value exists, a portion of which is mapped to the corresponding subpixel of the low resolution image. In this manner, a portion of the high resolution luminance in the image 4 is preserved in the subpixels of the low resolution image shown on the display. In this manner, the luminance resolution of the displayed image is enhanced. This approach is shown in FIG. 2, where the R, G, and B subpixels 10, 12 and 14 of the low resolution display are taken from the corresponding colors of different pixels 11, 13 and 15 of the high-resolution image. The subsampling acts to re-register the color fields of the display which serves to increase the available luminance bandwidth. Luminance resolution is increased when the RGB pre-filter bandwidths are adjusted to make use of this bandwidth. Sampling which comprises mapping color elements from different high-resolution image pixels to the subpixels of a display pixel may be referred to as "subpixel subsampling". Unfortunately, this "naïve" method of subpixel subsampling produces color artifacts (a.k.a., "color aliasing" or "chrominance aliasing") in addition to the beneficial enhanced luminance resolution. This color aliasing may be viewed, mathematically, as carrying the additional luminance resolution. To effectively reduce the color aliasing seen by the eye, while retaining a substantial part of the gained luminance resolution, various properties of the Human Visual System may be used. In FIG. 3, luminance Contrast Sensitivity Function (CSF) 17 refers to the luminance sensitivity of the human visual system with respect to spatial frequency. The chrominance CSF 19 refers to the chromatic sensitivity of the human visual system with respect to spatial frequency. The human visual system processes chromatic content as isoluminant modulations between red and green, and between blue and yellow. The color difference signals R-Y and B-Y of typical video are rough approximations to these modulations. For most observers, the bandwidth of the chromatic frequency response is ½ that of the luminance frequency response. Sometimes, the bandwidth of the blue-yellow modulation response is even less, down to about ⅓ of the luminance. It may be observed that viewers can not effectively see high frequency color content.

The visual frequency responses (CSFs) shown in FIG. 3 are idealized. In practice, they have a finite falloff slope, more representatively shown by the curve in FIG. 5A marked 30 (luminance CSF), and 32, 34 (chrominance CSFs). It is shown as the solid line 30 that has a cutoff frequency near 1.5 cy/pixel (display pixel), and is bandpass in shape with a peak near 0.2 cy/pixel. The R:G CSF 32 is shown as the dashed line that is lowpass with a cutoff frequency near 0.5 cy/pixel. The B:Y CSF 34 is shown as the long dashed low pass curve with a cutoff frequency similar to the R:G CSF, but with lower peak response. The range between the cutoff frequencies of the chromance CSF 32 and 34 and the luminance CSF 30 is the region where one may allow chromatic aliasing in order to improve luminance resolution. The chromatic aliasing will not be visible to the human eye because it falls outside the chromance CSF.

FIG. 5A also shows an idealized image power spectra 36 as a 1/f function, appearing in the figure as a straight line with a slope of −1 (since the figure is using log-log axes). This spectrum will repeat at the sampling frequency. The repeat spectrum 38 is due to the pixel sampling rate, and the repeat spectrum 40 is due to the subpixel sampling rate. Note that the shapes of the repeat spectra are different than the 1/f base band spectra 36 because they are plotted on log-log axes. The portions of these repeat spectra 38 and 40 that extend below their respective Nyquist frequencies represent aliasing. The leftmost spectrum 38, contributes to the chromatic aliasing since it is due to the pixel sampling rate. The right hand spectrum 40 contributes to the luminance aliasing. However, for the 1/f power spectrum shown, the luminance aliasing is nearly zero.

In FIG. 5A, no prefiltering has been applied to the source spectra. Consequently, aliasing, due to the pixel sampling (i.e., chromatic aliasing), extends to very low frequencies 35. Thus color artifacts will, in general, be visible (depending on the noise and contrast of the display). The chrominance aliasing is visible because it extends into the chromance CSF.

Referring to FIG. 4, curve 22 illustrates the frequency response of a filter that is one display pixel wide. In FIG. 5B, a prefilter was applied (a rect function in the spatial domain equal to three source image pixels, i.e., one display pixel), shown in FIG. 4 as a dashed-dotted line 22, to the source power spectrum, and it affects the baseband spectrum 42 in the region of 0.5 cy/pixel and greater, causing it to have a slope steeper than −1 shown at 44. The steeper slope effectively reduces the effects of the chromatic aliasing. The repeat spectra 38a and 40a also show the effect of this prefilter. For example, the tail 35 (FIG. 5A) is dramatically reduced to tail 46 (FIG. 5B) due to this filter. In particular, the visible chromatic aliasing, that is, aliasing under the two chrominance CSFs 32a and 34a, is reduced. However, it can be observed that this prefiltering also removes a substantial portion of the luminance resolution that is desirable to keep.

Accordingly, with such a prefiltering technique, desirable luminance resolution is sacrificed in order to reduce the undesirable chrominance aliasing.

BRIEF DESCRIPTION OF THE DRAWINGS

It is to be understood that these drawings depict only typical embodiments of the invention and are not therefore to be considered to be limiting of its scope. The invention will be described and explained with additional specificity and detail through the use of the accompanying drawings in which.

DETAILED DESCRIPTION OF THE PREFERRED EMBODIMENTS

Figure 1:
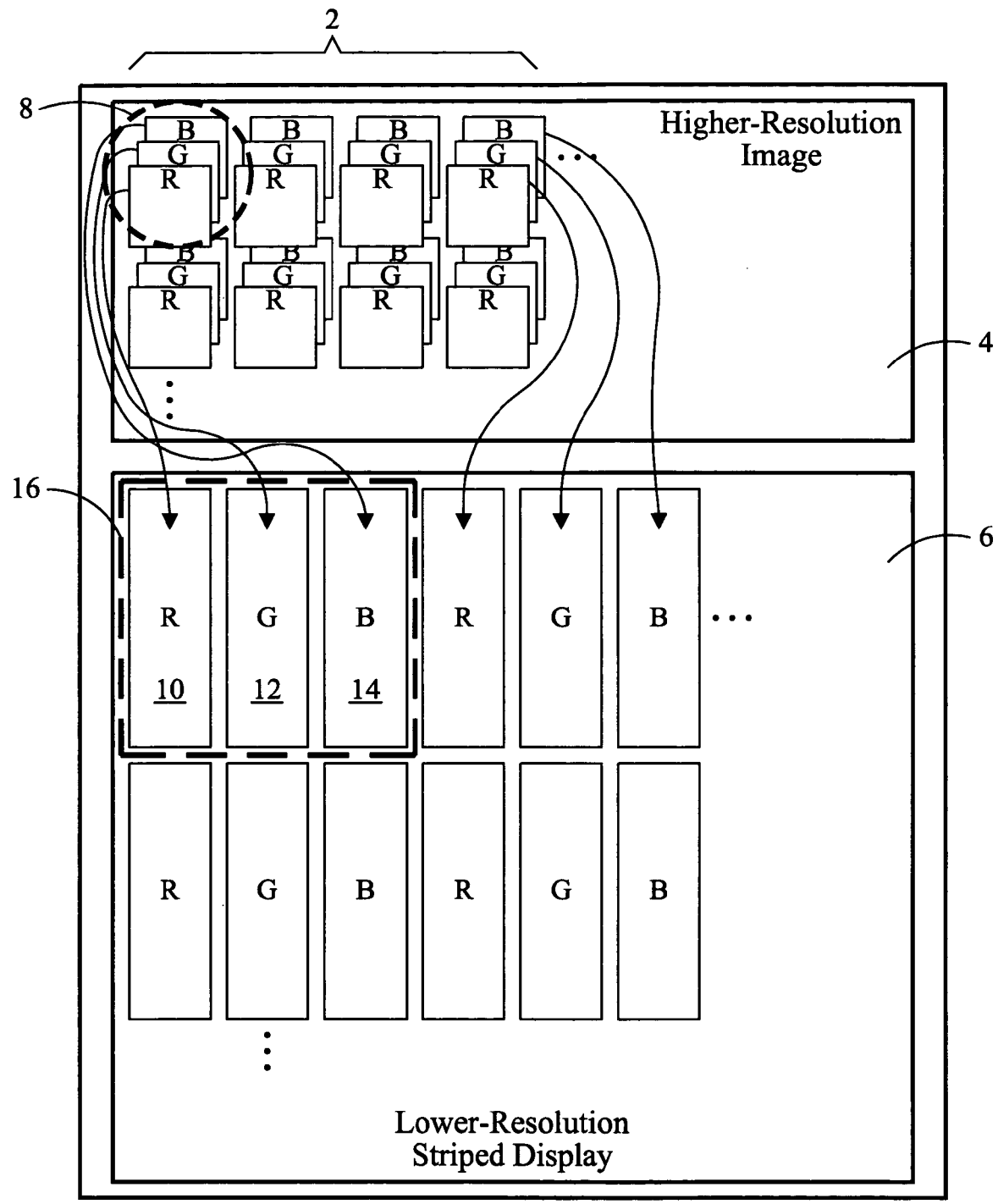
FIG. 1 is a diagram showing traditional image sampling for displays with a 1-dimensional stripped subpixel configuration.

An achromatic image, may be defined as an image having no readily visible color variation. This achromatic condition may occur when an image contains identical multiple layers or color channels thereby yielding a gray-scale image. Also, an achromatic image occurs when the subpixels have the same common value.

Embodiments may be described with reference to "RGB" images or domains, or "additive color domains", or "additive color images." These terms refer to any form of multiple component image domain with integrated luminance and chrominance information, including, but not limited to, RGB domains. Embodiments may also be described with reference to "YCbCr" images or domains, "opponent color" domains or images, or "color difference" domains or images. These terms refer to any form of multiple component image domain with channels which comprise distinct luminance channels and chrominance channels including, but not limited to, YCbCr, LAB, YUV, and YIQ domains.

The techniques described herein are preferably not carried out solely in the RGB domain, although they could be. The YCrCb color domain may also be used, wherein the luminance and the chrominance components are separated. Any domain may be used, such as for example, approximations to the visual systems opponent color channels. Examples include CIELAB, YUV, and Y R-Y B-Y. Also, color domains where one or more channels have an enhanced luminance component with respect to the other channels may likewise be used. One potential measure of such enhancements is if a channel has >60%, >70%, >80%, >90%, or >95% of the luminance. In addition, the enhanced luminance color domain may be as a result of implicit processing in another color domain as opposed to a traditional color transformation from one color space to another. The luminance component is normally used for the detail. As a result of the techniques described herein, the low chromatic frequencies (i.e. the visible ones) are attenuated with respect to the high chromatic frequencies that remain (i.e. the invisible ones), to yield a better subpixel sampled image that has reduced visible chromatic artifacts. In many cases, a conversion to a color space (or otherwise calculations) that enhances the luminance information in one or more channels in relation to the chromatic information, is desirable.

The system is described with respect to non-overlapping pixels, or otherwise spatially discrete color subpixels (e.g. color mosaic displays). However, the embodiments described herein may likewise be used with colors that are overlapping to a greater or lesser degree which in most cases result in another color. Moreover, the images may be displayed using different sizes of pixels. In addition, while the preferred embodiments are described with respect to rectangular pixels and subpixels, other shapes of pixels and subpixels may likewise be used. Also, any particular pixel may be formed by a plurality of subpixels in any arrangement, some of which may be duplicated.

The system may be used to modify images which have been pre-filtered or which exist in a format or condition which does not require filtering such as low-pass filtering. The high-resolution image may be defined in a manner such that the high-resolution image relative to a low-resolution image has more information content for a given portion of the image than the low-resolution image. The conversion process may be generally referred to as re-sampling, and different color planes may be re-sampled differently. In some cases the low and high resolution images may be displayed on the same monitor, the same pixel spatial density, different sized monitors with the same number of pixels, etc.

Figure 6:
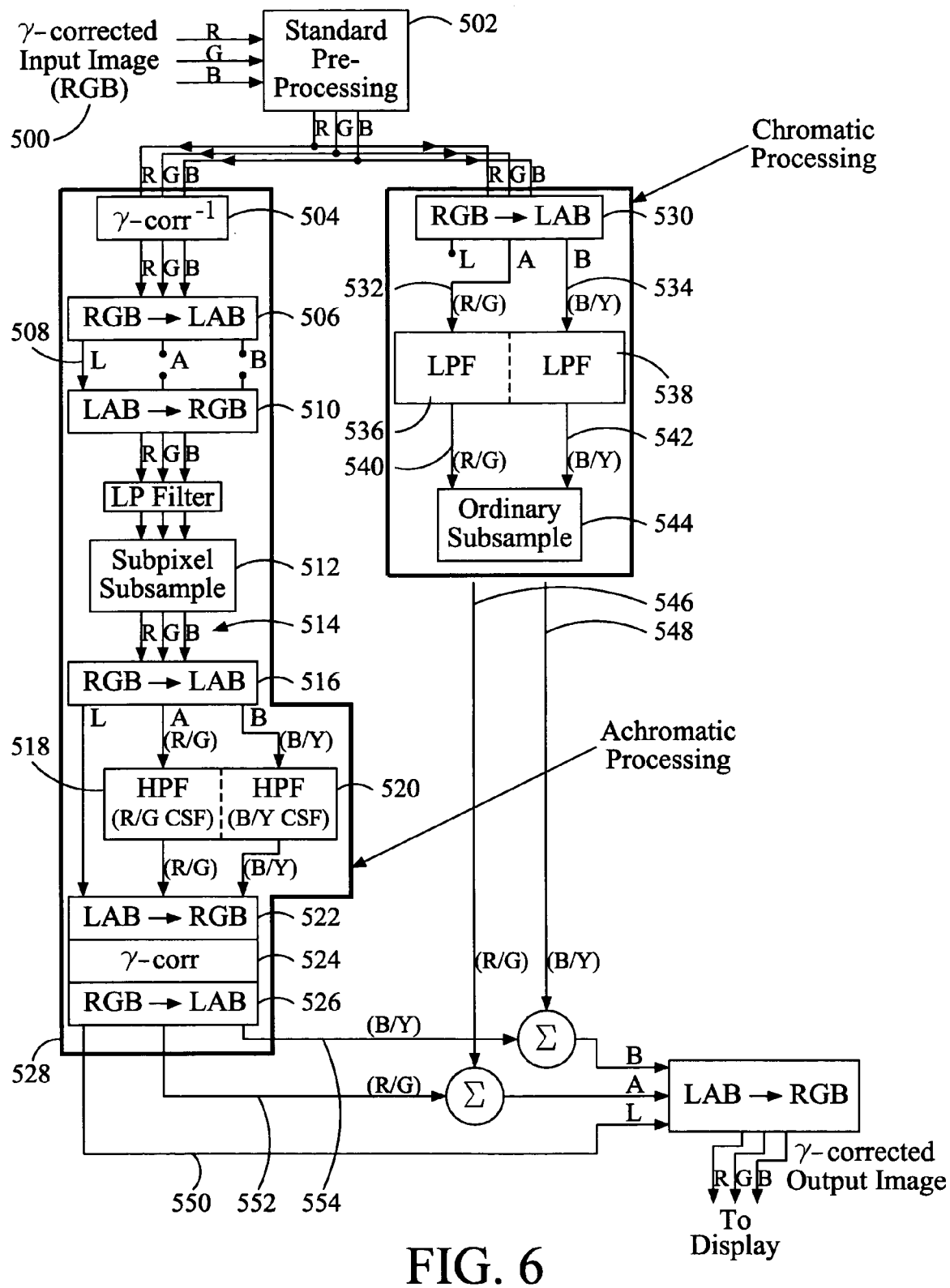
FIG. 6 is a block diagram showing a known use of a visual model.

Referring to FIG. 6, an input image 500, such as a RBG image, may be pre-processed 502 using any suitable technique. The input image 500 may be a gamma corrected image, if desired. The gamma correction may be inverted 504, if desired. The gamma inverted image 504 is converted to an opponent color space 506, such as a LAB color space. The value in the luminance channel 508 of the LAB color space for each relevant pixel is used to replace the respective subpixels with the corresponding luminance value. In general, the enhancement or separation in any manner of the luminance may be referred to as a luminance enhanced color space.

Figure 2:
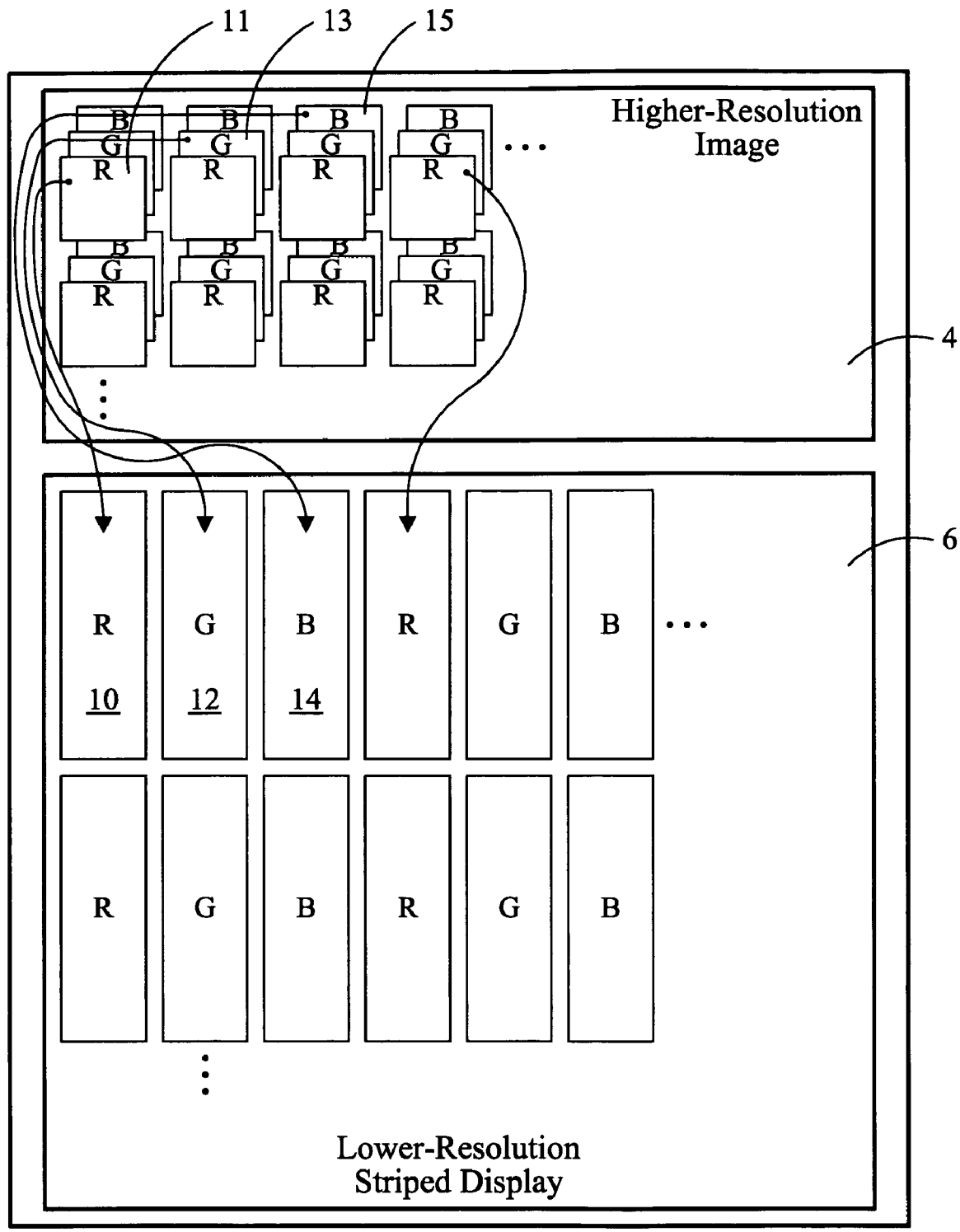
FIG. 2 is a diagram showing subpixel image sampling for a display with a 1-dimensional striped subpixel configuration.
Figure 3:
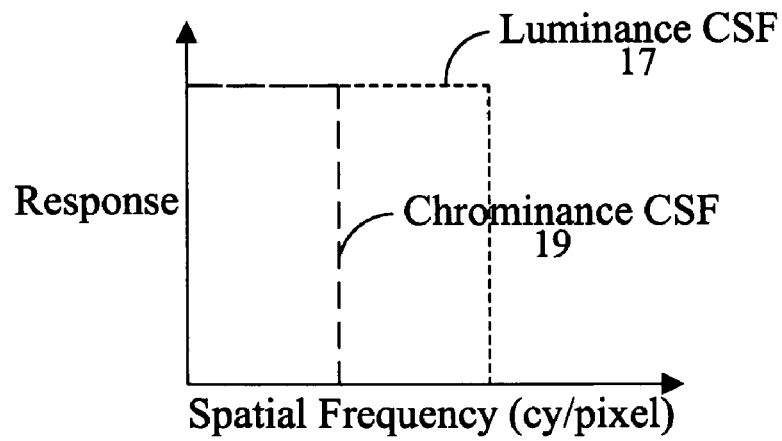
FIG. 3 is a graph showing idealized CSFs plotted on a digital frequency axis.
Figure 4:
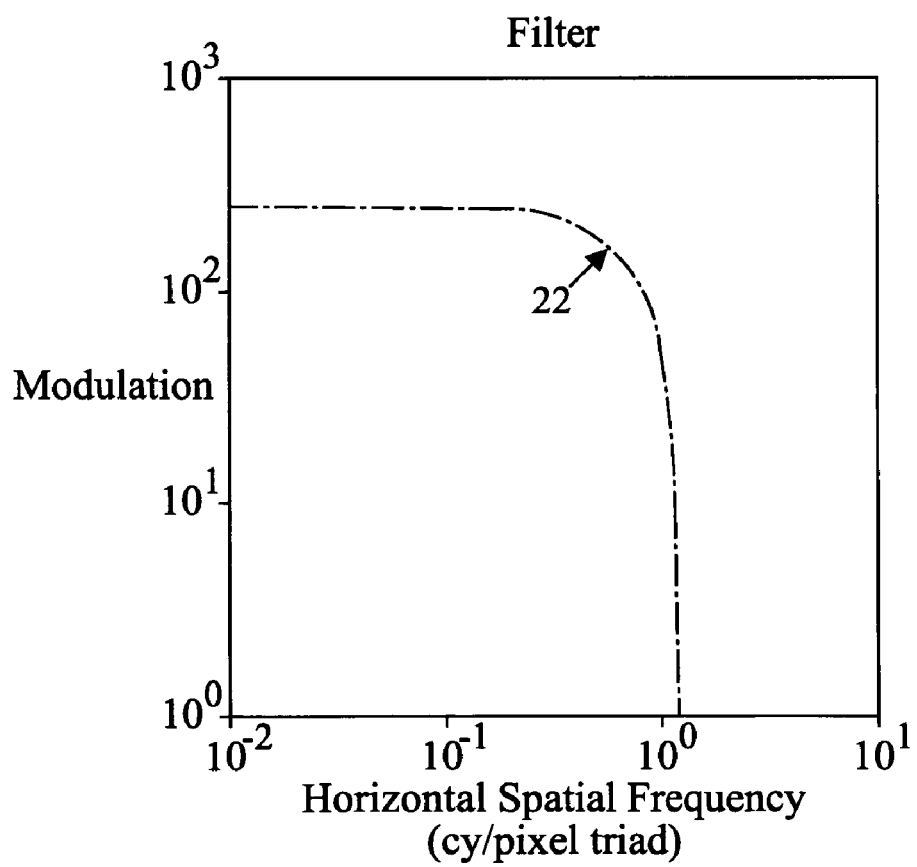
FIG. 4 illustrates the frequency response of a filter.
Figure 5A:
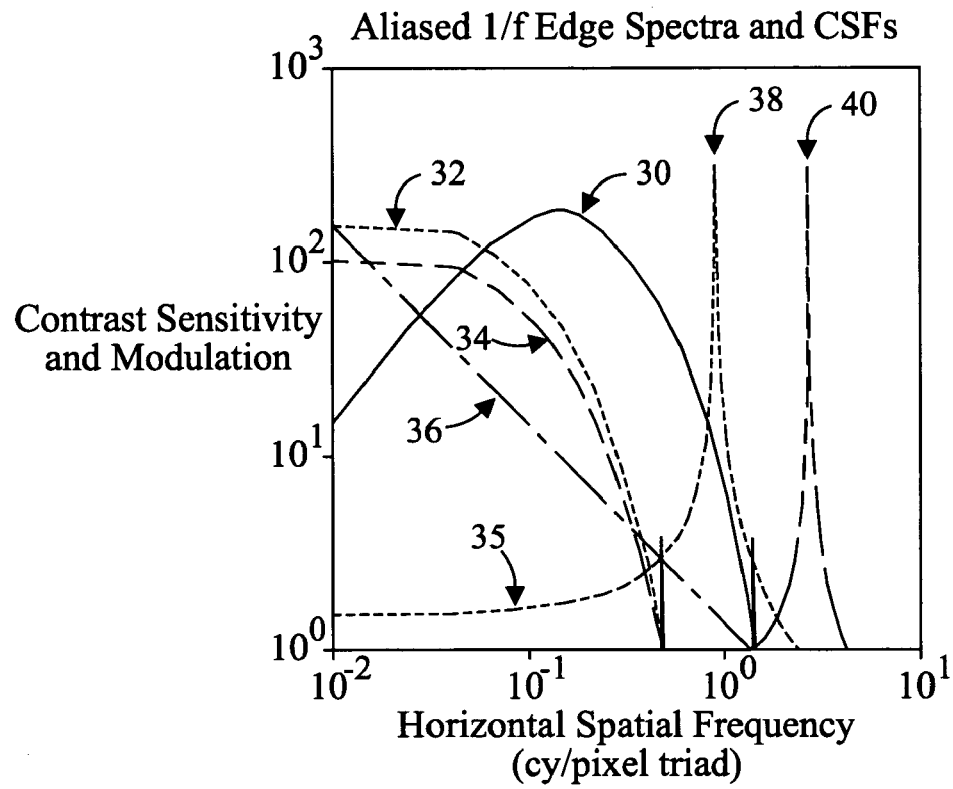
FIG. 5A is a graph showing an analysis using 1/f-power spectra repeated at pixel sampling and subpixel sampling frequencies.
Figure 5B:
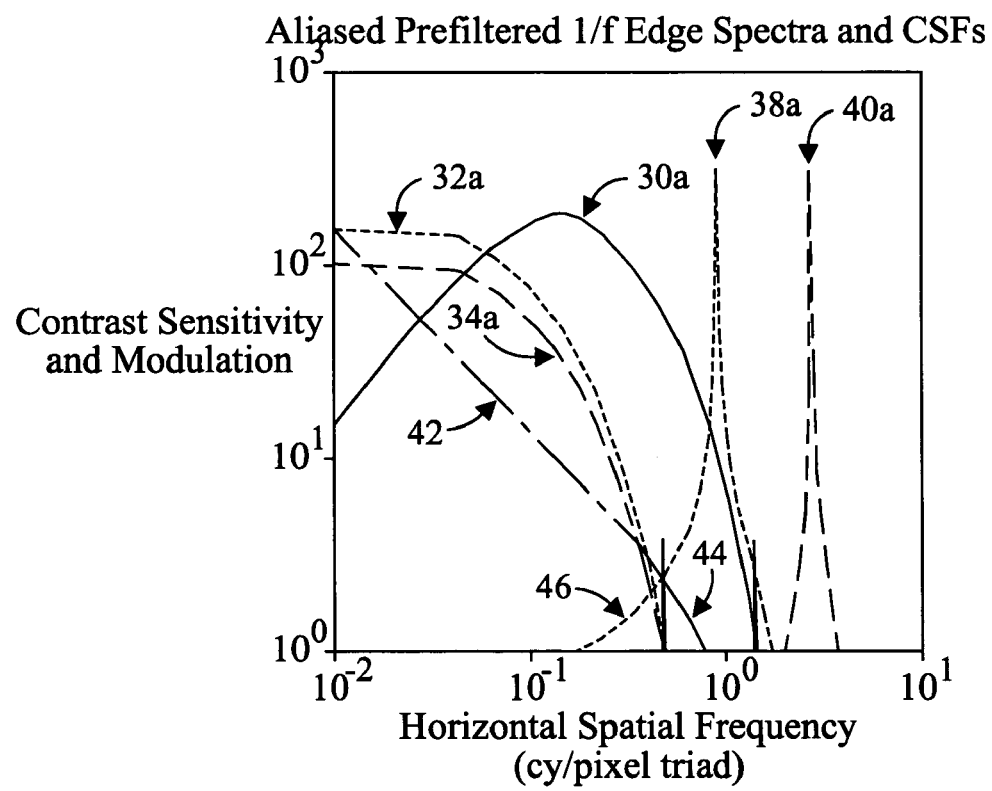
FIG. 5B is a graph showing an analysis using 1/f-power spectra repeated at pixel sampling and subpixel sampling frequencies with effects due to preprocessing.

The "image" at the output of block 510 may be filtered in a suitable manner (such as a low-pass filter) and subpixel sub-sampled 512, such as shown in FIG. 2, for example. The result of subpixel subsampling 512 is a spatial preparation of the luminance information for realignment as illustrated in FIG. 2, which is the result of a 3:1 down sampling ratio, but other ratios may be used depending upon the subpixel subsampling process and the prefiltering. The subpixel subsampling process of the luminance information creates spurious color information because the different color fields alias differently. The sub-sampled image 514 is converted to an opponent color space 516. The color information created as a result of the subpixel subsampling process 512 includes chromatic aliasing and in most cases entirely consists of chromatic aliasing. The chromatic channels A and B are high pass filtered by filters 518 and 520, respectively. Filters 518 and 520 reduce the low frequency (i.e. visible) chromatic aliasing (or attenuate with respect to high frequency (i.e., invisible) chromatic aliasing) resulting from the subsampling of the luminance information. The luminance channel and the chromatic A and B channels are converted to RGB space 522, gamma corrected 524, and converted to LAB color space 526 for combining with the output of the chromatic channel. It is to be understood that several alternative techniques may be used to perform the recombination. In addition, the gamma corrections may be omitted depending on the configuration and source image. The primary result of the achromatic processing 528 is to subpixel sub-sample the luminance information to achieve high luminance bandwidth while reducing the resulting generally visible chromatic aliasing (lower chromatic frequencies) that results from the subpixel subsampling of the luminance information. The generally non-visible chromatic aliasing (higher chromatic frequencies) may be maintained because it carries with it high resolution luminance information that may be observed by the viewer. It is noted again that the luminance CSF has a substantially higher cutoff frequency than the chromatic CSF.

In the case that the input image is a color image the original chromatic content may be processed in a separate manner, namely, the chromatic processing branch of FIG. 6. The pre-processed image 502 may be converted to a luminance enhanced color space 530, such as LAB. The color channels A 532 and B 534 may be filtered by a corresponding low pass filter 536 and 538 in order to reduce potential aliasing. The filtered color channels A 540 and B 542 are sub-sampled 544 in an ordinary manner. The ordinarily sub-sampled channels 546 and 548 generally include the chromatic information for the image to be displayed.

For color images one may convert the A and B output of the chromatic processing to isoluminant RGB and add it to the RGB output of the achromatic processing, if desired. It is also noted that although FIG. 6 illustrates LAB, other embodiments may use other color spaces such as YUV, YCrCb, etc.

In general the luminance channel 550 may be thought of as including luminance information for the image at a bandwidth commensurate with the pixel sampling rate. The high frequency chromatic channels 552 and 554 that are aliased contain high resolution luminance data. These may be added to the color channels A 546 and B 548 (or otherwise combined in some manner) which contain the sub-sampled chromance from the original image. The result of these operations is a color display with luminance resolution that exceeds that normally associated with the pixel sampling rate. The resulting image is converted from LAB to RGB color space.

Figure 7C:
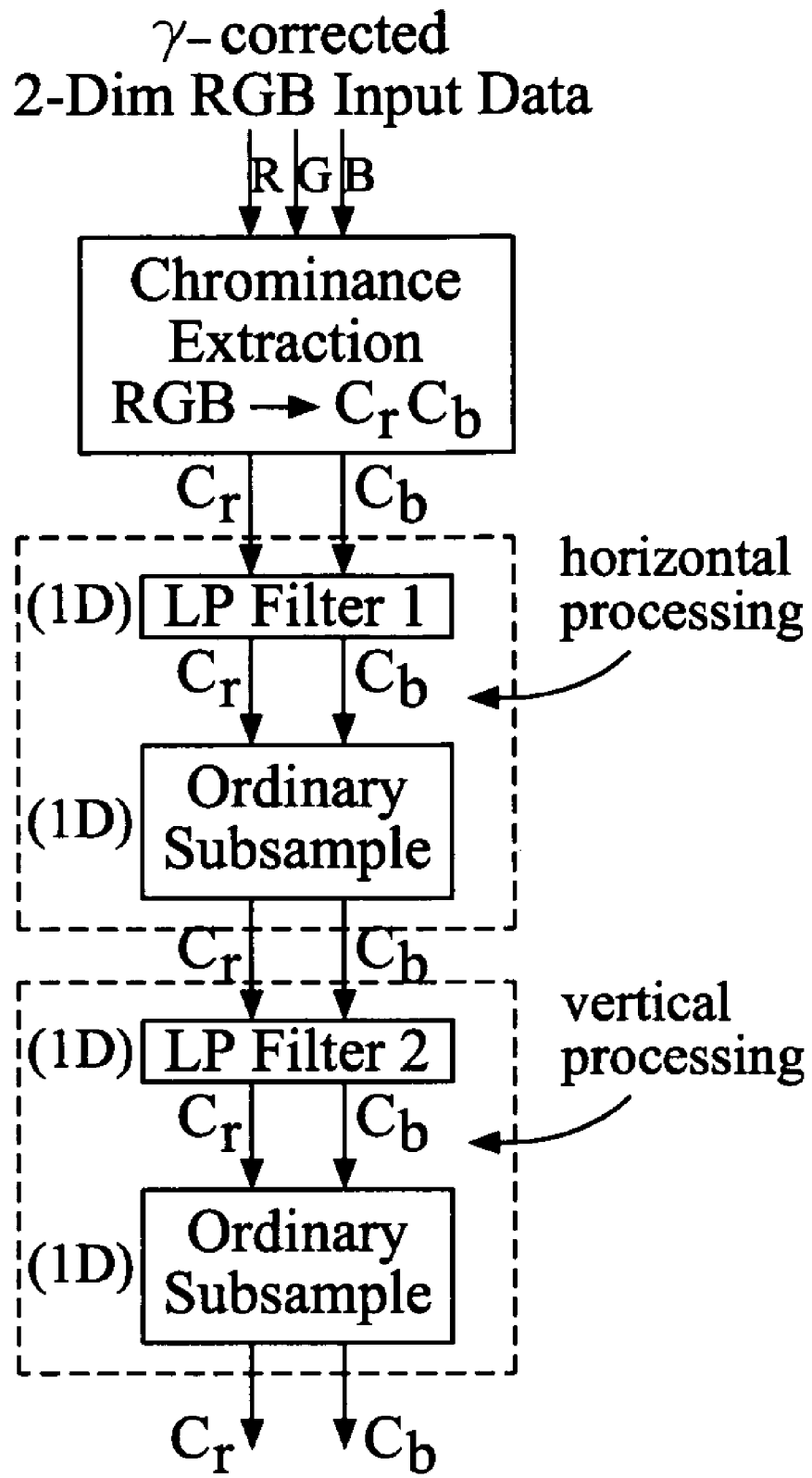
FIG. 7 is a block diagram of a modified embodiment.

Another embodiment, similar to FIG. 6 is illustrated in FIG. 7. FIG. 7B illustrates the overall technique. FIG. 7A illustrates the achromatic processing channel. FIG. 7C illustrates the chromatic processing channel. A gamma corrected RGB input image is preprocessed, as illustrated in FIG. 7B. The processed gamma corrected image is brought into the linear domain, or otherwise another domain, as illustrated in FIG. 7A for the achromatic processing channel of FIG. 7B. The luminance signal (luminance enhanced signal) is extracted from the gamma inverted image. The luminance signal is lowpass filtered in the horizontal direction then sub-sampled in the horizontal direction, if desired. The luminance signal is low pass filtered in the vertical direction and ordinary sub-sampled in the vertical direction, if desired. The horizontal and vertical processing may be commuted if desired. The luminance signal from the horizontal and vertical processing is converted from RBG to YCrCb. An unsharp mask (e.g., a high pass filter) whose design is based on the shape of the chrominance CSFs is applied to the color channels to reduce the color artifacts that would otherwise be visible. The image is converted to RGB, gamma corrected, and converted back to YCrCb. In the chromatic processing channel of FIG. 7C, the chromatic signals (e.g., Cr and Cb) are extracted from the gamma corrected image. The chromatic signals are lowpass filtered in the horizontal direction and ordinary sub-sampled, and lowpass filtered in the vertical direction and ordinary sub-sampled. The horizontal and vertical processing may be reversed in order or performed in a simultaneous manner, if desired. The resulting signals from the achromatic (FIG. 7C) and chromatic (FIG. 7B) processing channels are added (FIG. 7B), and post-processed, as desired. The resulting image may be displayed on the display.

It may be observed that at least a portion of the chromatic aliasing, due to the achromatic processing, is identified into "visible" and "invisible" components. The terms "visible" and "invisible" are loosely associated with the viewers ability to observe the aliasing. The image is therefore processed in a manner that reduces this visible error while maintaining much of the luminance information that is present in the invisible part of the chromatic aliasing. In alternative embodiments, the techniques may be extended to operate upon multiple images, which achieves similar results in luminance resolution and the reduction of chromatic aliasing.

Existing subpixel rendering technology is specifically directed toward striped one dimensional pixel patterns. An analysis of the "zeroth order" spatial spectral properties of a two-dimensional subpixel pattern illustrates the unrealized consideration of other geometries (such as two-dimensional structures) as being a structure.

Figure 9:
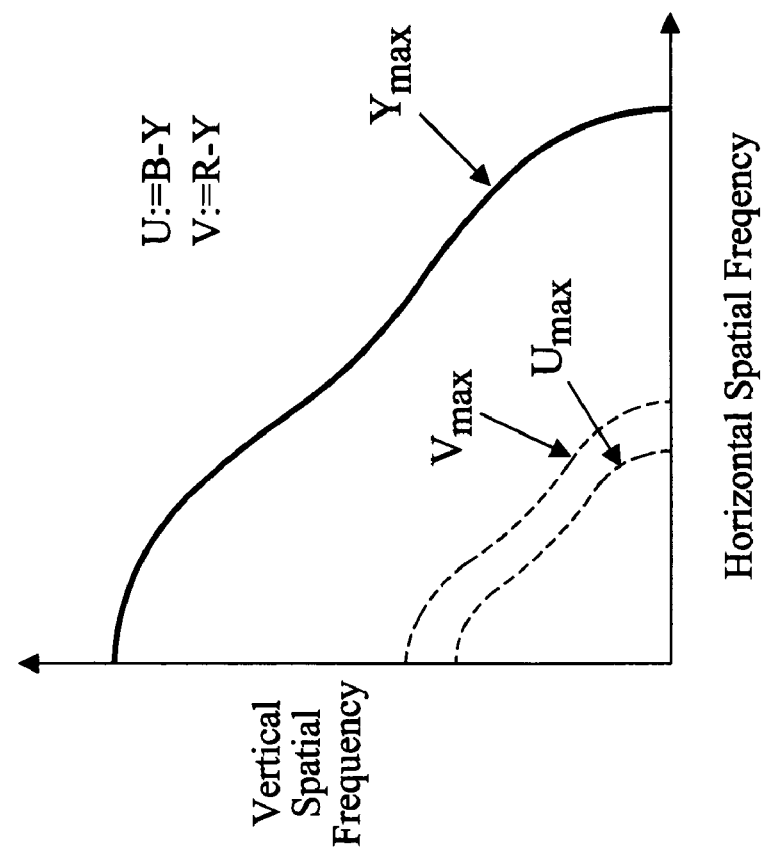
FIG. 9 illustrates another subpixel sampling geometry.
Figure 8:
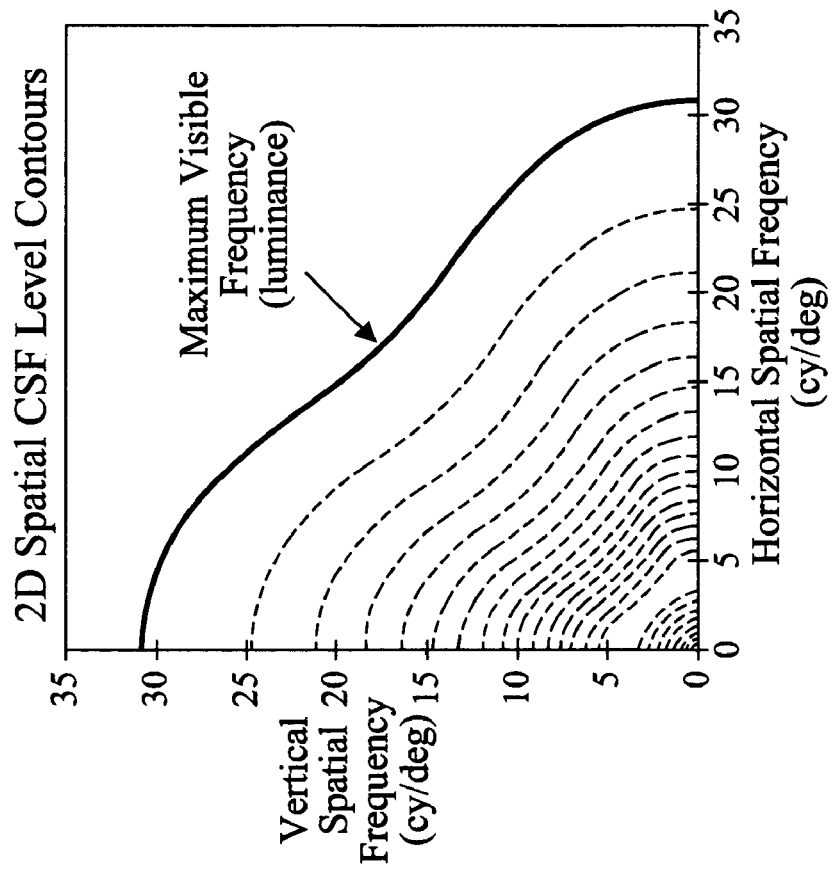
FIG. 8 illustrates a subpixel sampling geometry.

A contour plot of the curves of constant value on the luminance CSF of the human visual system ("HVS") is shown in FIG. 8 with the axis units being in cycles per degree of subtended angle. These units are convenient because they remove dependence on viewing distance and physical pixel size. The outer limit of human vision is shown by the thick black curve. Beyond the thick black curve of FIG. 8, the average person cannot see significant detail so any displayed information in this region is, in a sense, wasted. FIG. 9 shows only this outer limit curve for luminance plus the limit curves for each of the HVS opponent color channels. It may be observed that there is between one third and one half of the visual bandwidth in these channels as compared with luminance. It is this difference in bandwidth between luminance and chrominance that permits the chromatic anti-aliasing techniques, as previously discussed.

Figure 10A:
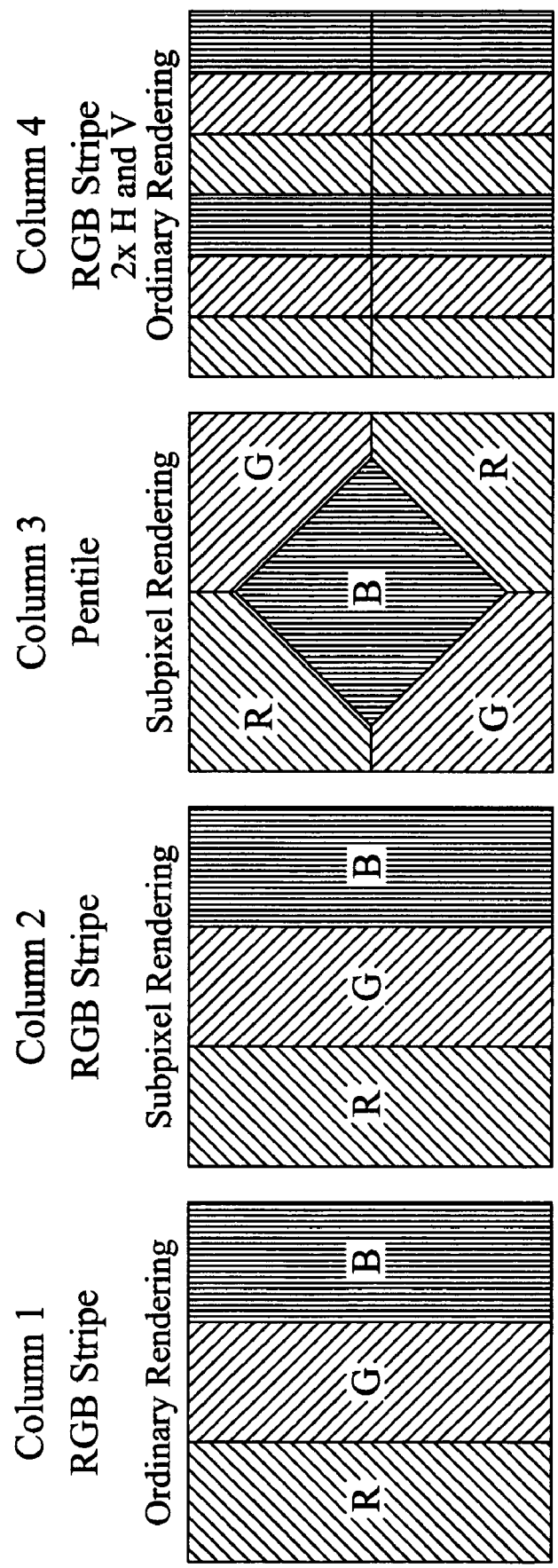
FIGS. 10A-10C illustrate rendering and spatial frequencies.
Figure 10B:
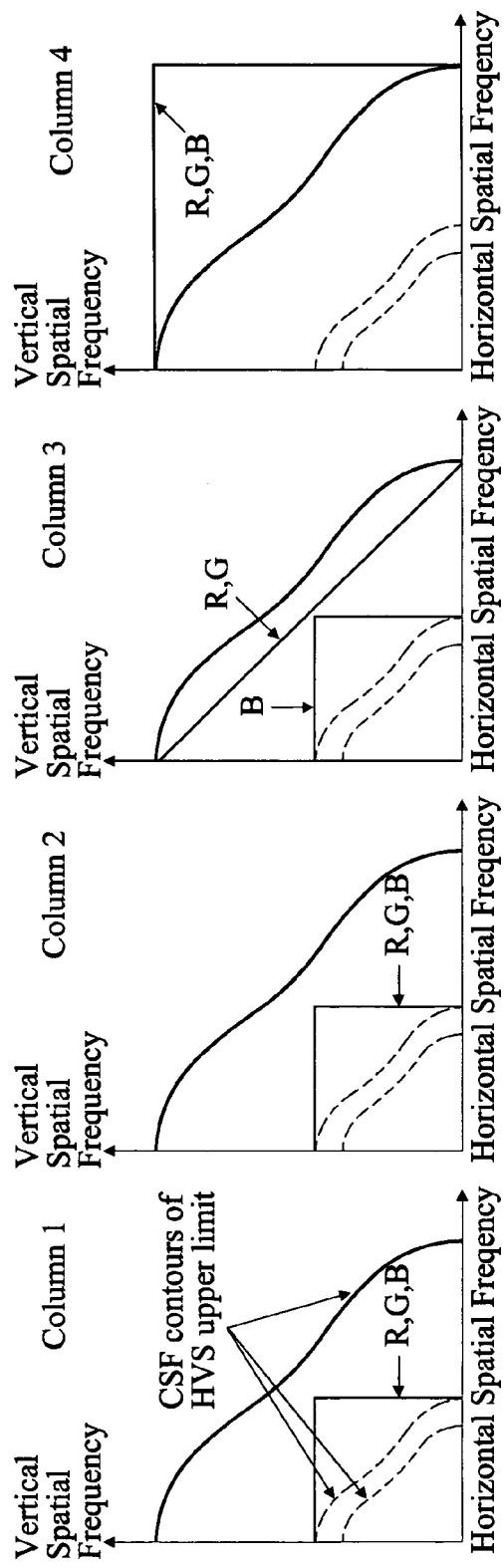
Figure 10C:
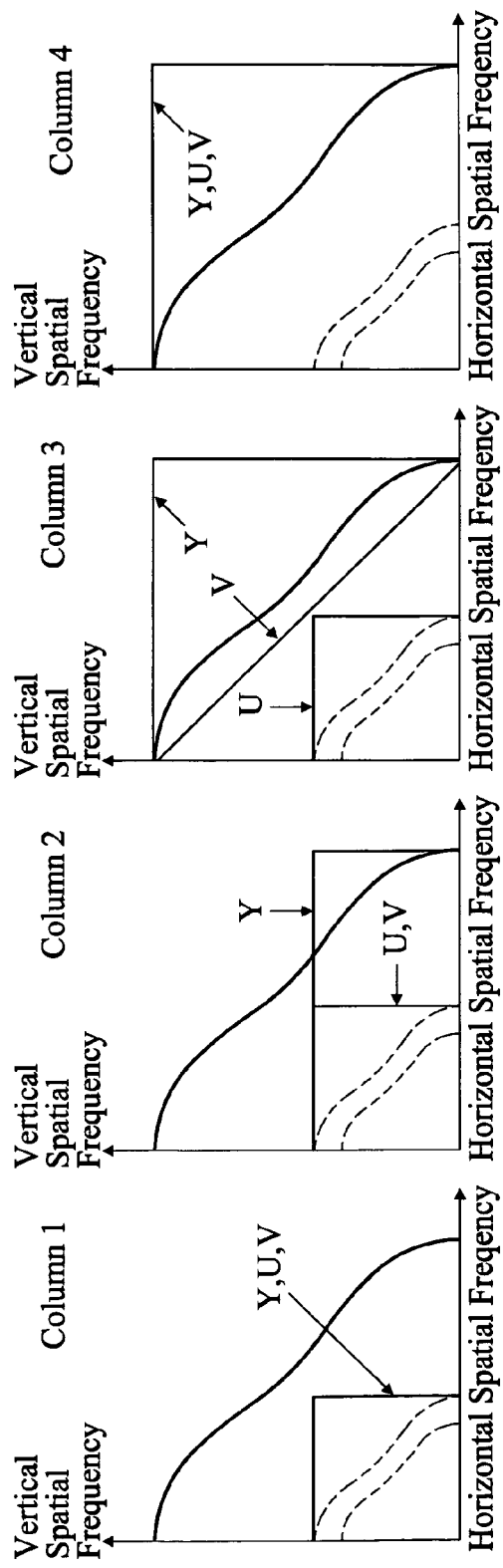

FIGS. 10A, 10B, and 10C illustrate four representative sampling schemes (columns 1, 2, 3, and 4). The unit pixel display is a pixel from an ordinary RGB striped matrix display, shown on column one of FIG. 10A. On column four of FIG. 10A is a display pixel having twice the horizontal and vertical resolution of the unit display pixel. In neither of these cases is subpixel sampling assumed. One may assume that the viewer is sitting at a distance from the display such that the horizontal and vertical limits of vision are at the Nyquist for the 2×H & V pixel structure. This assumption is indicated by the R, G, and B spectral footprint in FIG. 10B column four. It may be observed that the horizontal and vertical band edge of column four of FIG. 10B is just at the limit of visual luminance. Diagonal components of column four of FIG. 10B, supportable by the display, fall outside the viewer's ability to see them and so the display is "wasting" bandwidth.

The notion of waste is not merely philosophical. Since a display's manufacturing cost increases with gate and transistor count; having more (sub)pixels than necessary incurs a real cost. The spectral footprint for R, G, and B, on column one of FIG. 10B, is illustrated for the unit pixel display. The spatial sampling frequency for the unit pixel display is half of the 2× display (column four of FIG. 10B) so the spectral footprint is half as large horizontally and vertically. When subpixel sampling is used as illustrated in column two of FIG. 10A on such an RGB striped panel, no advantage is gained in the individual color planes as illustrated in column two of FIG. 10B in comparison to column one of FIG. 10B. Accordingly, each color plane has the same sampling frequency as before so the spectral footprint for the primary colors is also unchanged, as shown by the plot in column two of FIG. 10B (RBG stripe subpixel rendering). The pentile subpixel rendering of column three of FIG. 10A has the R and G samples falling on a so-called "offset" sampling lattice so their associated spectral footprint has a diamond shape shown in column three of FIG. 10B. The B plane, on the other hand, is sampled on a square lattice with spatial period equal to the unit pixel display and so has the same spectral footprint as the unit pixel as illustrated in column three of FIG. 10B. The interesting behavior is shown in FIG. 10C where one considers the spectral shapes of the luminance, Y, and the two chrominance components, U and V. For simplicity one may assume that R and G make equal contributions to Y, and that B makes none. One may also assume that U=B-Y and V=R-Y, i.e., that the opponent color space is nearly that of NTSC. For the "zeroth order" analysis, this turns out to be an acceptable approximation to the visual opponent color channels.

The spectral footprints of Y, U, and V for both the unit pixel display (column one of FIG. 10A and FIG. 10C) and the 2× display (column four of FIGS. 10A and 10C) are readily discerned. In these two cases, all color components in the unit pixel display (column one of FIG. 10A) are sampled at half the rate as the 2× display (column four of FIG. 10A) so its footprint is half as wide in H and V.

For the RGB stripe display with subpixel sampling (column two of FIGS. 10A and 10C), one may reap a 2× gain in luminance resolution in comparison to the unit pixel display (column one of FIGS. 10A and 10C) in the horizontal direction because the R and G subpixels can now independently participate in adding information to the luminance field. Vertically there is no benefit to Y (see column two FIG. 10C) in comparison to the unit pixel display (see column one of FIG. 10C). For U and V, the footprints are limited by the periods of the B and R components they contain (see column two of FIG. 10C). Hence there is no gain in chrominance bandwidth over traditional sampling. In addition, if prefiltering commensurate with the desired luminance bandwidth is done, then color aliasing will occur. So the one dimensional RGB striped display has the double disadvantage that the vertical resolution of Y is significantly below the visual system's ability to see, and color aliasing will occur if one wants to preserve the horizontal resolution of Y.

The two dimensional pentile geometry (see column three of FIG. 10A) suffers fewer disadvantages than the RGB subpixel rendered display (see column two of FIG. 10A). For the two dimensional pentile geometry there is still "too much" diagonal Y resolution for the HVS but since the cost of this pixel is just five subpixels instead of twelve for the 2× display (see column four of FIG. 10A), the real manufacturing cost is considerably lower. The V component of column three of FIG. 10C signal likewise surpasses the HVS, being limited by the sampling lattice of its R component. The extra available bandwidth, however, reduces aliasing of this component if the input image is filtered commensurate with the HVS luminance limit. The U component of column three of FIG. 10C is much smaller, being limited by the blue lattice, but it just surpasses the HVS ability in this channel so there is no waste. On the other hand, one can expect some aliasing in this component if the image is filtered commensurate with the Y bandwidth of the HVS.

Two-dimensional subpixel geometries present issues not readily envisioned in the one dimensional striped geometry, such as the one illustrated in column two of FIG. 10A. The very definition of a pixel comes into question in a two dimensional geometry because, depending on its centroid, different combinations of subpixels are needed to render a "white dot". Also, for subpixel geometries like the pentile pattern of column three of FIG. 10A, the modulation transfer functions of different subpixels are different, making more difficult a precise analysis based on space-invariant methods. For these reasons it is preferable to view the rendering problem in terms of optimization.

An optimization development only suitable for vertical stripped one dimensional R, G, B, displays is described by J. Platt (2000) in "Optimal filtering for patterned displays," IEEE Signal Processing Letters, vol. 7, no. 7, pp. 179-180. Platt starts with full-color high resolution image samples, $x_n$, sampled at the subpixel locations of the target display. Scalar-valued display subpixels are denoted by $\alpha_n$. The RGB striped display geometry dictates that the $\alpha_n$ alternatively represent a red, a green, or a blue subpixel as a function of (n mod 3). The index, n, denotes horizontal subpixel position. The optimization technique may be formulated to minimize, with respect to a perceptually relevant metric, an error based on $E_n = M_n \alpha_n - C x_n$, where C is a 3×3 matrix that converts $x_n$ into an opponent color space, and where $M_n = 3 C_{n \bmod 3}$.

Figure 11:
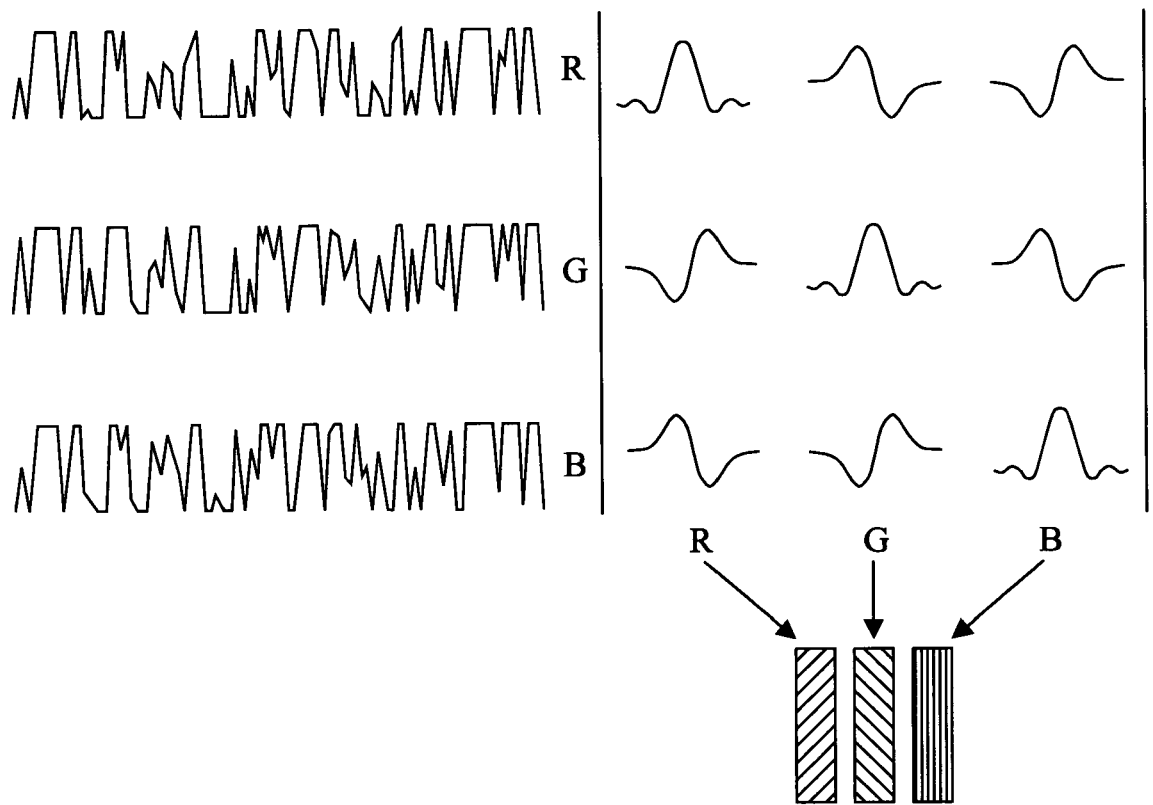
FIG. 11 illustrates a set of filters.

The result of the optimization is an array of one-dimensional resampling filters, as illustrated in FIG. 11, where an input scan line, x, is filtered and subsampled to yield an output display scan line α. The matrix nature of the pre-filter is due to the error being defined in a color space different from the input/output color space. It may be observed that there are nine filters.

A 1-dimensional unconstrained optimization, such as disclosed by Platt, is not readily extensible to 2D. Accordingly, a new formulation is necessary for each two-dimensional geometry one wishes to optimize against. The present inventors came to the realization that one suitable technique is to formulate the problem is as a constrained optimization, and the two dimensional geometric description of the display may be absorbed into the constraints and thus a single design framework would apply to any arbitrary two dimensional subpixel geometry without the need to completely redesign the system each time.

In addition, as will be elaborated shortly, formulating the problem as a constrained optimization givens additional information about the display. This information is embedded in the Lagrange multipliers associated to the constraints and may be extracted for use in evaluating a given two-dimensional pattern.

A suitable framework for constrained optimization generally takes the form:

$$\nabla \epsilon(\tilde{x}) + \sum_i \lambda_i \nabla G_i(\tilde{x}) = 0$$

$$\forall i \, G_i(\tilde{x}) = 0$$

where the $G_i$ are constraints, the $\lambda_i$ are associated Lagrange multipliers, and where $\epsilon$ is a perceptually weighted quadratic function of the two dimensional transform of the $\{E_{mn}\}$. Here, however, $$E_{mn} = C \cdot (\tilde{x}_{mn} - x_{mn})$$

where $x_{mn}$ are samples from the two-dimensional sampled scene, and $\tilde{x}_{mn}$ are full color display samples indexed by the subpixel indices (m,n). Before constraints are imposed, the system may assume that subpixels of the target display have full color capability. To simplify the analysis the system may also assume that the scene is sampled on the same lattice as $\tilde{x}$. The constraints, $G_i$, control the behavior of each subpixel in the display. For example, to define a green subpixel at display lattice location (m,n), two linear constraints may be imposed $$G_{i_1}(\tilde{x}) = \tilde{x}_{mn}^0, \quad G_{i_2}(\tilde{x}) = \tilde{x}_{mn}^2$$

where $\tilde{x}_{mn}^c$ is the $c^{th}$ input color component of $\tilde{x}_{mn}$. $G_{i_1}(\tilde{x}) = \tilde{x}_{mn}^0$, $G_{i_2}(\tilde{x}) = \tilde{x}_{mn}^2$ state that the $0^{th}$ (red) and $2^{nd}$ (blue) components of $\tilde{x}_{mn}$ will be forced to zero when $\forall i G_i(\tilde{x}) = 0$ is applied.

Figure 12:
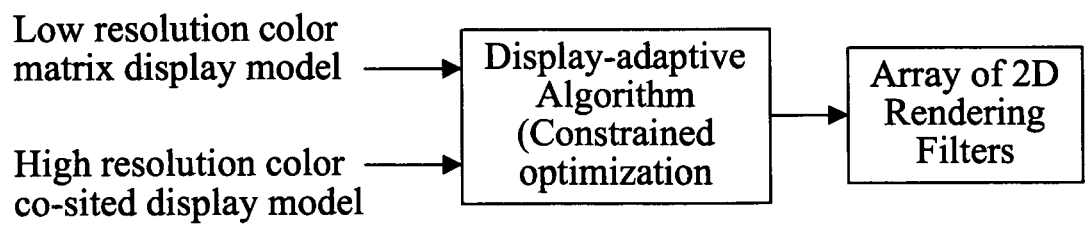
FIG. 12 illustrates a technique for generating a set of filters.

A high-level diagram of the basic idea is given in FIG. 12. The algorithm takes as inputs a description (model) of the low resolution target color matrix display and a description of the color co-sited high resolution display. In their simplest form these descriptions contain nothing more than the positions of the pixel and subpixel centroids. More sophisticated models might contain, for example, information about the subpixel shape, i.e., MTF. The process yields an array of 2D rendering filters that are then applied to the high resolution image. This results in a low resolution image, properly subpixel sub-sampled to minimize the aforementioned perceptual error.

Figure 13:
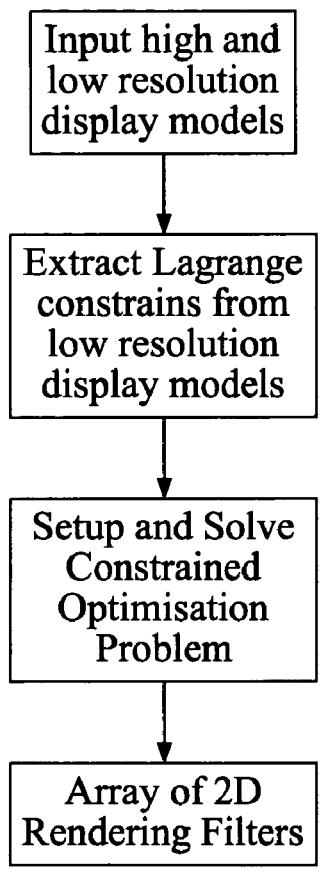
FIG. 13 illustrates the general filter design process.
Figure 14:
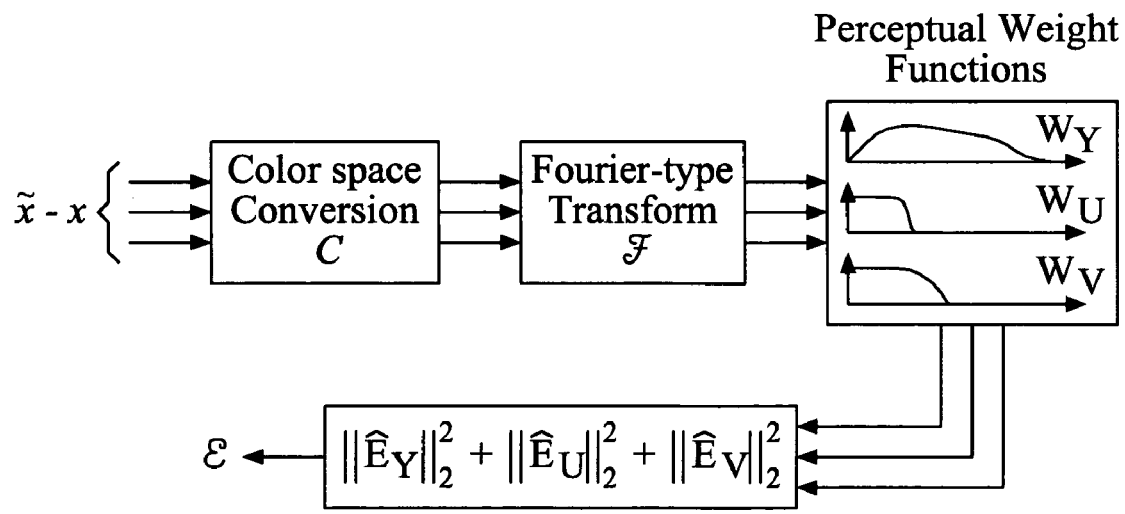
FIG. 14 illustrates the formation of a perceptual error function.

FIG. 13 illustrates a flowchart of one technique for designing the appropriate filters. The extraction process in the second step is the formation of the constraint equations, one for each constrained subpixel, discussed above. The setup in the third step of FIG. 13 is essentially the formation of the perceptual error functional E which is depicted in FIG. 14. Incoming to FIG. 14 is the difference between the high and constrained low-resolution displays. This is a vector valued RGB error signal which is first transformed into a perceptually relevant opponent color space, such as YUV. This new vector-valued signal is denoted E in FIG. 14 and its components include a luminance signal line and two color-difference signal lines, Red/Green and Blue/Yellow. The precise definition of this color space is determined via the color transformation matrix C. Next, the error signal is transformed via an orthogonal spatial transform, F, into a Fourier domain where two-dimensional transform domain perceptual weights (depicted, for simplicity, by one-dimensional functions) are applied. Finally a scalar valued error functional, $\epsilon$, is formed. The solution of the constrained optimization problem minimizes $\epsilon$ with respect to $\tilde{x}$, subject to the subpixel constraints.

One may now set up the constrained optimization problem. One may use, by way of example, the Pentile pattern of column three, FIG. 10A as the two-dimensional example. It is also noted that the same type of formulation may be applied to any two-dimensional color matrix geometry composed of a tessellated macro-pixel pattern. The pentile pattern is shown on the left side of FIG. 15. Henceforth this pattern may be referred to as a macro-pixel for purposes of discussion.

Figure 15:
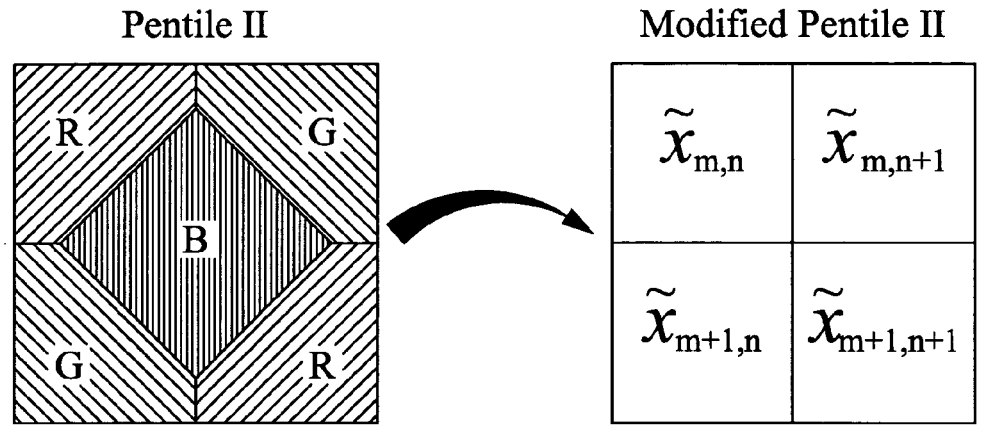
FIG. 15 illustrates a pentile pattern.

To facilitate the setup, one may first modify the macro-pixel pattern to that shown on the right of FIG. 15. The patches represent yet-to-be-constrained "subpixel" positions. In this illustration the central blue subpixel has been removed and will distribute its contribution equally among the four patches via constraints. It is noted that the framework may take into account the effect of subpixel MTF (shape) so that the solution is dependent on the shift in subpixel centroid position. Seven linear constraints (per macro-pixel) on the $\tilde{x}_{mn}$ yield the desired subpixel pattern:

$$G_{i_1}(\tilde{x}) = \tilde{x}_{m,n}^1$$

$$G_{i_2}(\tilde{x}) = \tilde{x}_{m,n+1}^0$$

$$G_{i_3}(\tilde{x}) = \tilde{x}_{m+1,n}^0$$

$$G_{i_4}(\tilde{x}) = \tilde{x}_{m+1,n+1}^1$$

$$G_{i_5}(\tilde{x}) = \tilde{x}_{m,n}^2 - \tilde{x}_{m,n+1}^2$$

$$G_{i_6}(\tilde{x}) = \tilde{x}_{m+1,n}^2 - \tilde{x}_{m,n}^2$$

$$G_{i_7}(\tilde{x}) = \tilde{x}_{m,n}^2 - \tilde{x}_{m+1,n+1}^2$$

The quadratic form of $\epsilon$ implies that the gradient may be written as a linear (affine) system $\nabla \epsilon = A\tilde{x} - r$. In this expression, the matrix, A, depends only on (i) the color space conversion matrix, C, (ii) the orthogonal basis functions that define the two dimensional spatial frequency transform (not explicitly given here), and (iii) the two dimensional transform domain weight functions that model the luminance and chrominance CSFs of the HVS (also not explicitly expressed here but illustrated in FIG. 14). In particular, A is independent of $\tilde{x}$. Similarly, the right hand side vector, r, is dependent on these same three sets of quantities and, in addition, the input data, x, but not on the display data, $\tilde{x}$. Therefore one can express $$\nabla \epsilon(\tilde{x}) + \sum_i \lambda_i \nabla G_i(\tilde{x}) = 0$$

$$\forall i G_i(\tilde{x}) = 0$$

in the form:

$$[A \; G'(\tilde{x})^T] \cdot \begin{bmatrix} \tilde{x} \\ \Lambda \end{bmatrix} = r, \; G(\tilde{x}) = 0$$

where G', the differential of G, has $\nabla G_i(\tilde{x})_T$ as its $i^{th}$ row. This system is non-linear, in general, due to G and G'. But in this case, the constraints are linear. Hence $G(\tilde{x})$ reduces to $G\tilde{x}$ and $G'(\tilde{x})$ is independent of $\tilde{x}$. Therefore $$[A \; G'(\tilde{x})^T] \cdot \begin{bmatrix} \tilde{x} \\ \Lambda \end{bmatrix} = r, \; G(\tilde{x}) = 0$$

can now be rewritten as an augmented linear system:

$$\begin{bmatrix} A & G' \\ G & 0 \end{bmatrix} \begin{bmatrix} \tilde{x} \\ \Lambda \end{bmatrix} = \begin{bmatrix} r \\ 0 \end{bmatrix}$$

The operators G and G' depend only upon the display constraints and not upon the display or input data. Furthermore, the simplicity of the on/off constraints makes G and G' sparse, reducing the complexity of numerical solution. This system may be solved by numerical techniques to give an operator that converts the input data, x (contained in r) into rendered data, $\tilde{x}$, to be displayed. Furthermore A, G and G' are invariant to macro-pixel shifts in x so that the solution to $$\begin{bmatrix} A & G' \\ G & 0 \end{bmatrix} \begin{bmatrix} \tilde{x} \\ \Lambda \end{bmatrix} = \begin{bmatrix} r \\ 0 \end{bmatrix} \text{ is}$$

not merely a linear operator but an array of two dimensional macro-pixel shift-invariant filters that may be implemented using convolutional or frequency domain techniques. Such an array corresponds to the array of one dimensional rendering filters of FIG. 11. An example of such an array for the pentile pattern is given in FIG. 16. In some embodiments, the result is a set of more than 9 filters.

Figure 16:
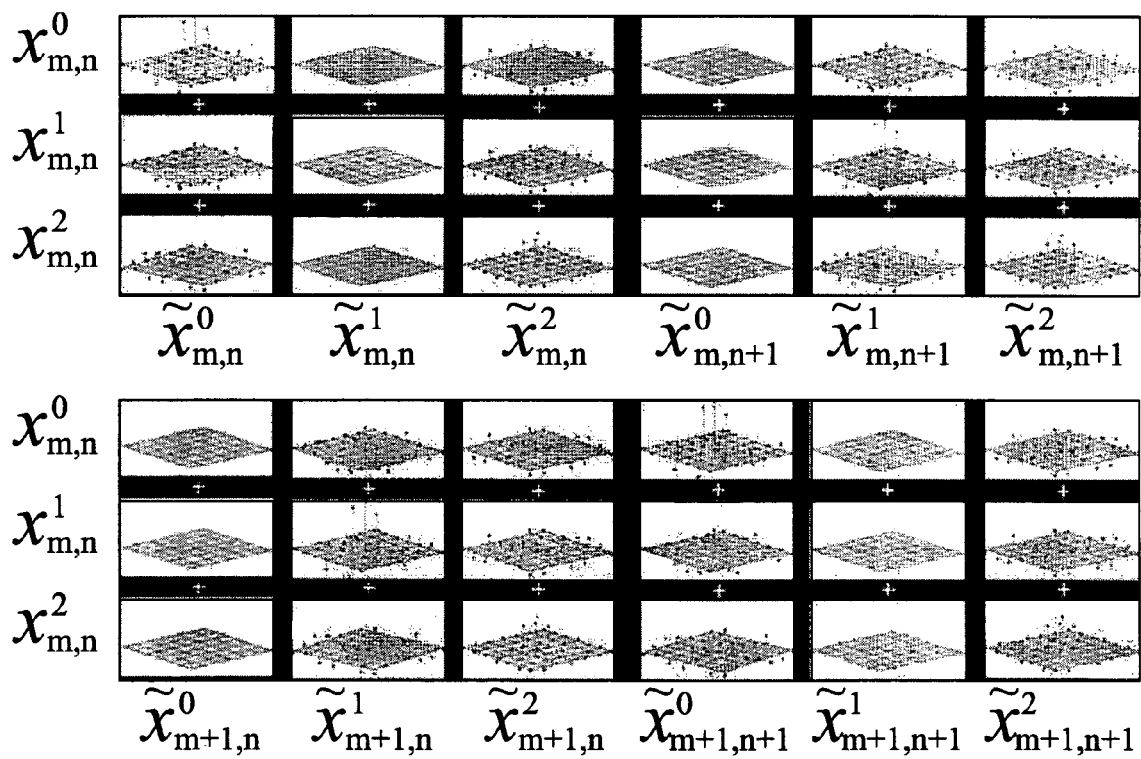
FIG. 16 illustrates a set of filters.

The array of 36 two dimensional filters shown in FIG. 16 is grouped into 4 sub-arrays of nine filters. Each sub-array corresponds to the collection of filters that will handle one (RGB) subpixel of the pentile pattern. As in FIG. 11 there are "cross filters" which compute, say, the green input channel's contribution to the upper left red subpixel. This would be the filter in the 2nd row, $1^{st}$ column of the upper left sub-array. Also, note that the filters in, for example, the 2nd column of this sub-array vanish. This corresponds to the fact that the green subpixel in the upper left position is constrained to be off.

The optimization framework presented above minimizes a perceptual error relative to the 12 norm, i.e., in the least squares sense. Other error, or perceptual error, measures may likewise be used. Minimization of least-squares error does not always result in a reduction of perceived error, even when that error is defined in a perceptually relevant way. The chrominance errors made by the subpixel rendering process carry valid high-resolution luminance information. These two considerations suggest that one may amend the rendering framework to minimize only the luminance error, and ignore whatever chrominance errors the process makes. Then, after the Lagrange minimization is performed, chrominance error is post-processed as previously discussed. This is accomplished by appropriate adjustment of the transform domain perceptual weight functions discussed earlier in connection with the Lagrange minimization.

In particular, chrominance aliasing error is high-pass filtered in accordance with the chrominance CSF of the visual system to remove those components that would be visible and leave those that would not, thus retaining a majority of high-resolution "luminance carrying" chrominance aliasing. Such a high-pass post-processing step requires a preprocessing step wherein the incoming RGB image is split into achromatic and chromatic channels similar to FIG. 7. The achromatic channel is processed as indicated above so that the only color signals that come out of the achromatic rendering process are the result of aliasing. A separate rendering process is used on the iso-luminant color channels to preserve and retain as much of the original image color as is possible.

There are several advantages to this overall framework. For one, if the unconstrained display is assumed to be densely sampled, constraints can be applied to model different subpixel shapes, as well as the black mask areas, thus enabling the filters to take these display characteristics into account in the filter design procedure. Also the framework can be applied to the one-dimensional striped geometry currently used by almost all LCD displays today. A potentially a better set of rendering filters may be obtained, especially when the analysis window includes several scanlines. In addition, the solution to the constrained problem provides not only filter coefficients but the Lagrange multipliers, $\lambda_i$. Each $\lambda_i$ can be interpreted as measuring the sensitivity of the error to the $i^{th}$ constraint. This means that for the on/off constraints, the magnitude of the associated $\lambda_i$ measures how much one gains by adding an additional subpixel. This information, in turn, may be used to explore novel display geometries and assist in determining a possible optimal geometry subject to given manufacturing and image quality criteria.

Moreover, the framework allows the modeling of displays with non-standard subpixel colors by appropriate combination of the subpixel constraints. A particular example of this is the ability to design rendering filters for the newly proposed "white subpixel" displays that incorporate a certain percentage of regularly spaced achromatic subpixels to enhance brightness and the ability to render white and other desaturated regions of the image. Also, this framework can design optimal or improved rendering filters for subpixels having cyan, magenta, or yellow hues. Also, this framework may be used with substantially white pixels, where no or substantially no color filter is used in the case of display structures normally including color filters.

In other embodiments of the system the technique may be applied on any two or more axes or directions, which do not necessarily need to be orthogonal or aligned with the pixel geometry. In addition, embodiments of the system may include filters such that the filters filter the luminance information and attenuate at least a portion of lower frequency chromatic information with respect to at least a portion of higher frequency chromatic information resulting from the filtering of the luminance information. It is also to be understood that the filtering techniques, in general, are designed to increase spatial resolution of the display by selectively setting individual subpixels of the display. In some cases the re-sampling of the image is performed as a post-process to the filtering, in other embodiments it is part of the filtering, and in other embodiments it is another process associated with luminance processing for the luminance enhanced color space. In some cases the luminance processing may be performed in the manner of a filter, or together with the filtering process, apart or together with the re-sampling process. Also, in some cases there may be "multiple" filters embodied in a single composite filter.

Figure 17:
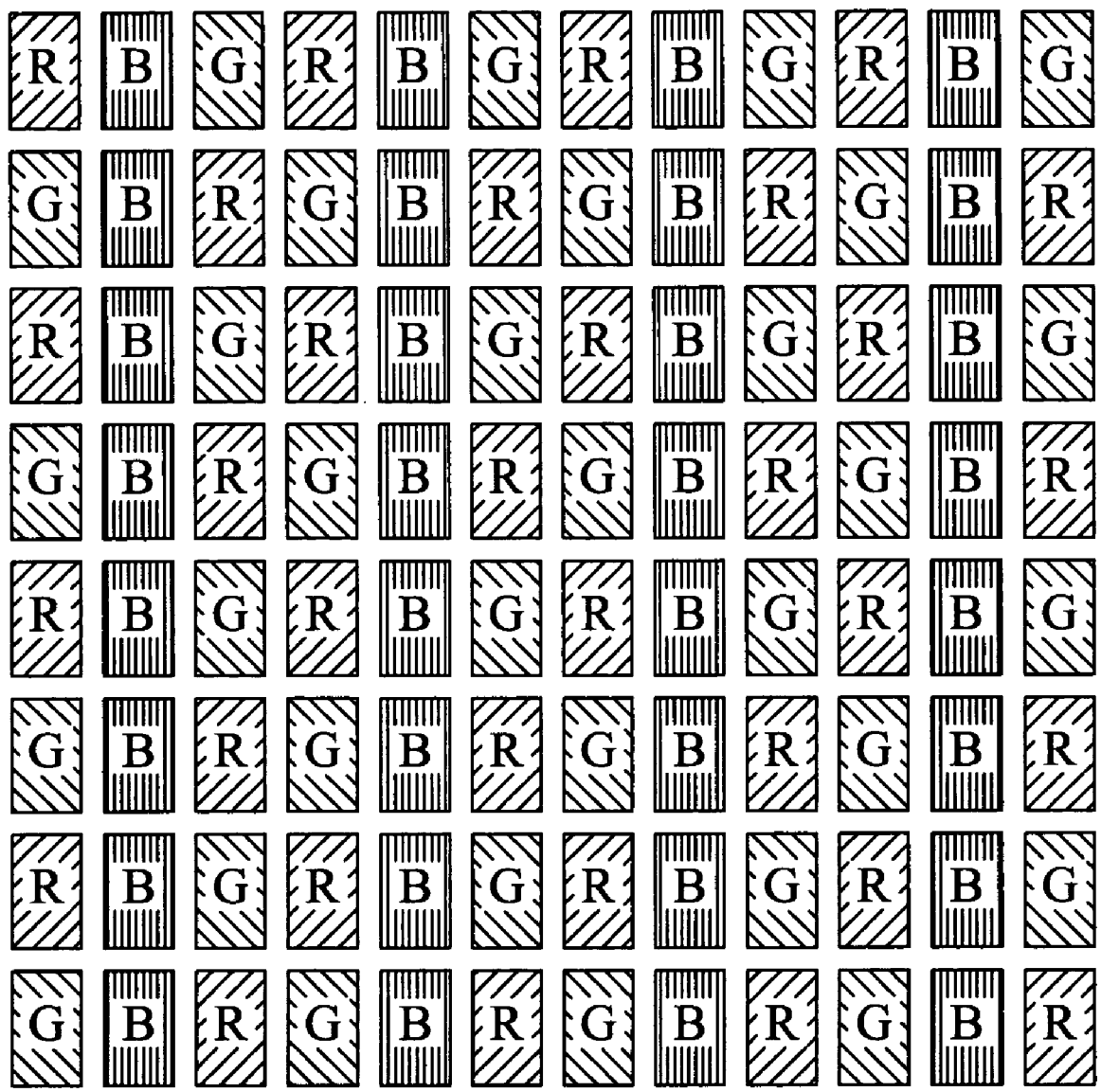
FIG. 17 illustrates another pixel pattern.
Figure 18:
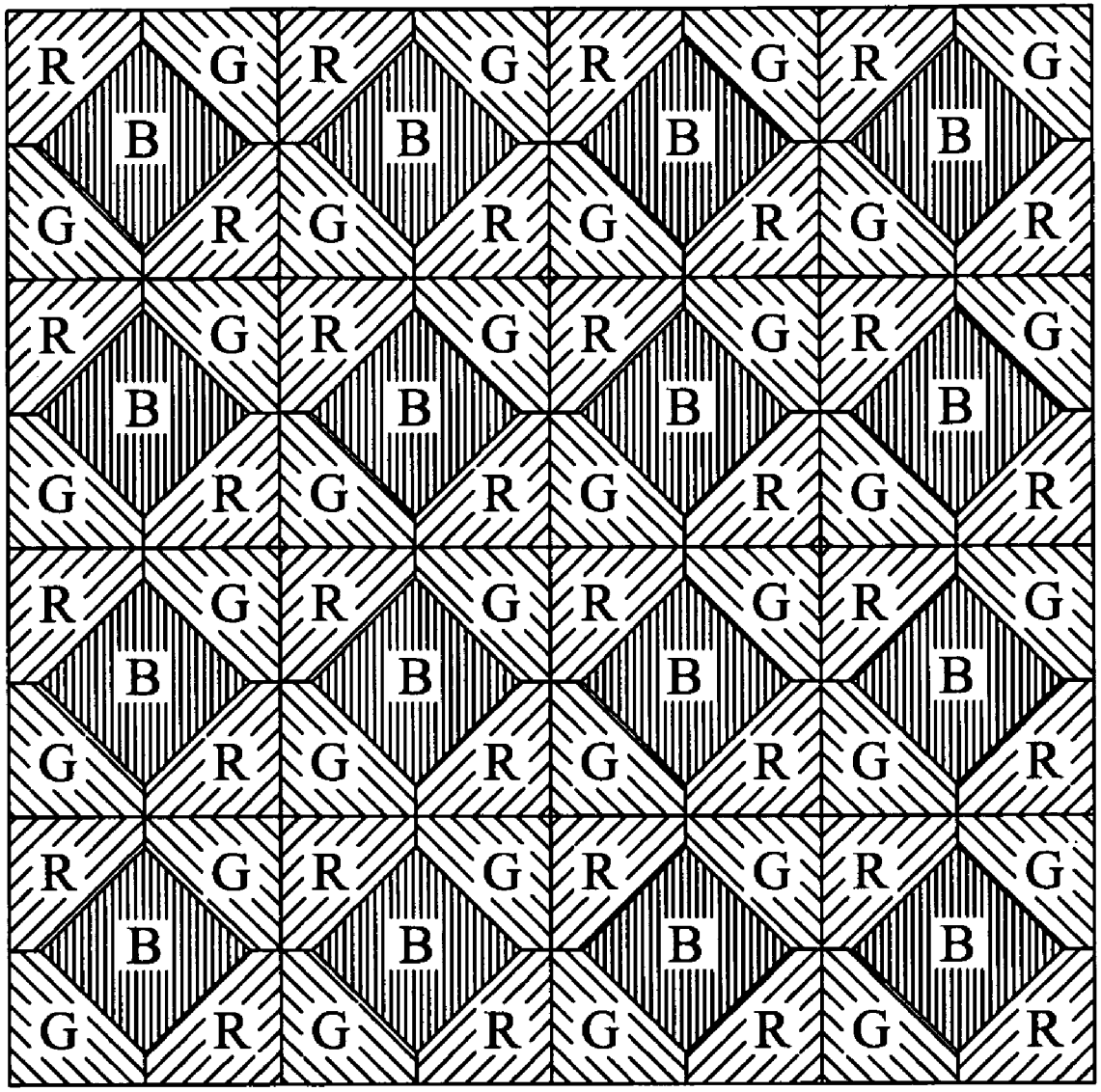
FIG. 18 illustrates another pixel pattern.

It is to be understood that any subpixel arrangement may likewise by used, such as those illustrated in FIGS. 17 and 18. The techniques described herein are applicable to horizontal one-dimensional filtering, vertical one-dimensional filtering, or two-dimensional filtering. In addition the filtering in 1D or 2D may be performed on an axis that is not aligned with the pixels or subpixels. Further, any post processing that may be desired may be performed prior to re-sampling. Furthermore, the chromatic aliasing may be reduced by using a suitable matrix of pre-filters in a manner similar to Betrisey, et al. Furthermore, the subpixel subsampling may be replaced with an ordinary subsampling operation and the phase shift(s) of the color planes incorporated into the pre-filters.

In the case of typical R, G, B subpixels, many designers tend to ignore the luminance contribution of B because it is typically less than 15%. In this case designers tend to primarily use R and G contributions in the algorithm design. However, the present inventors came to the realization that the resulting luminance pattern has non-uniform samples, namely, red luminance, green luminance, no luminance, etc. The existing systems fail to take into account this non-uniformity of the display. Moreover, the pattern shown in FIG. 18 has non-uniform luminance samples due to the red and blue subpixels, this is because the centroids of the subpixels are off center. To achieve improved re-sampling, especially in the case that the luminance and chromatic aspects are sampled differently, the processing may take into account the non-uniform sampling in a manner that reduces artifacts, such as chromatic artifacts, to less than it would have been had the non-uniform sampling not been considered.

What is claimed is:

1. A method for filtering an image for displaying said image on a display comprising:
    (a) filtering said image using a set of filters that reduce an error metric, wherein said filters are based upon a constrained optimization that includes at least one constraint based on a two-dimensional geometric parameter of said display, and wherein said error metric is perceptually weighted quadratic of a two-dimensional transform of a function having the form $E_n = M_n \acute{a}_n - C x_n$, where "E" represents said error metric, "x" represents samples from said image, "á" represents scalar display subpixel values, "n" denotes subpixel locations, "C" represents an operation that converts $x_n$ into an opponent color space, and $M_n$ is a function of $C_n$ of the form $M_n = a C_n \mod a$, "a" being the number of display subpixels per pixel;
    (b) re-sampling said filtered image to a lower resolution;
    (c) displaying said re-sampled image on said display.

2. The method of claim 1 wherein said set of filters includes more than 9 different re-sampling filters.

3. The method of claim 2 wherein said filters filter said luminance information and attenuate at least a portion of lower frequency chromatic information with respect to at least a portion of higher frequency chromatic information resulting from said filtering of said luminance information.

4. The method of claim 2 wherein said filters are based upon a perceptual error metric.

5. The method of claim 2 wherein said display is a liquid crystal display.

6. The method of claim 5 wherein said display includes a pattern of subpixels in a horizontal direction that are different than the pattern of subpixels in a vertical direction.

7. The method of claim 2 wherein said re-sampling and said filtering are performed in the same operation.

8. The method of claim 2 wherein said re-sampling is performed after said filtering.

9. The method of claim 2 wherein a plurality of said filters are one-dimensional.

10. The method of claim 2 wherein a plurality of said filters are two-dimensional.

11. The method of claim 1 wherein said display includes a two-dimensional sub-pixel geometry.

* * * * *